United States Patent
Kim et al.

(10) Patent No.: US 10,344,192 B2
(45) Date of Patent: Jul. 9, 2019

(54) THERMO-REVERSIBLE ADHESIVE COMPOSITION AND THERMO-REVERSIBLE ADHESIVE SHEET COMPRISING THE SAME

(71) Applicants: Samsung Electronics Co., Ltd., Gyeonggi-do (KR); Guardnec Co., Ltd., Gyeonggi-do (KR)

(72) Inventors: Yongbeom Kim, Gyeonggi-do (KR); Kiho Park, Gyeonggi-do (KR); Bowon Jung, Seoul (KR); Bugon Kim, Gyeonggi-do (KR); Jaeik Song, Gyeonggi-do (KR); Wonseok Choi, Gyeonggi-do (KR)

(73) Assignees: Samsung Electronics Co., Ltd., Yeongtong-gu, Suwon-si, Gyeonggi-do (KR); GUARDNEC Co., Ltd., Cheoinseong-ro, Namsa-myeon, Cheoin-gu, Yongin-si, Gyeonggi-do (KR)

( * ) Notice: Subject to any disclaimer, the term of this patent is extended or adjusted under 35 U.S.C. 154(b) by 514 days.

(21) Appl. No.: 15/008,884

(22) Filed: Jan. 28, 2016

(65) Prior Publication Data

US 2017/0081556 A1 Mar. 23, 2017

(30) Foreign Application Priority Data

Sep. 21, 2015 (KR) .................. 10-2015-0133424

(51) Int. Cl.
C09J 7/02 (2006.01)
C09J 175/04 (2006.01)
(Continued)

(52) U.S. Cl.
CPC ............. *C09J 175/04* (2013.01); *C09J 7/20* (2018.01); *C09J 133/10* (2013.01); *C09J 163/00* (2013.01);
(Continued)

(58) Field of Classification Search
CPC . C09J 175/04; C09J 7/20; C09J 133/10; C09J 163/00; C09J 2475/00;
(Continued)

(56) References Cited

U.S. PATENT DOCUMENTS

2003/0232192 A1* 12/2003 Kishioka .................. C09J 7/38
428/354
2004/0029383 A1* 2/2004 Tanaka ................... H05K 3/007
438/689
(Continued)

FOREIGN PATENT DOCUMENTS

JP 2006040814 A * 2/2006 ............. H01M 2/10
JP 2007-23113 A 2/2007

OTHER PUBLICATIONS

Mi-Sun Kang, the press 'Money Today', Metal-Framed with Wireless-Charging: Galaxy S6 is Vailed Out, pp. 1-6, Mar. 2, 2015.

*Primary Examiner* — Eli D. Strah
(74) *Attorney, Agent, or Firm* — Cha + Reiter, LLC.

(57) ABSTRACT

A thermo-reversible adhesive composition containing a base resin, methyl acetoacetate, and a metal-organic complex compound having the formula $M(X)_n(R)_o$, wherein: M is a metal selected from the group consisting of aluminum, iron, and nickel, X is acetylacetonate, R is $H_2O$, n is an integer equal to 2 or 3, and o is an integer greater than or equal to 0 and less than or equal to 2, such that n+o is equal to 3 or 4.

16 Claims, 11 Drawing Sheets

(51) Int. Cl.
    *C09J 133/10*     (2006.01)
    *C09J 163/00*     (2006.01)
    *C09J 7/20*     (2018.01)
    *C09J 5/06*     (2006.01)
    *C09J 7/35*     (2018.01)
    *C08K 5/00*     (2006.01)
    *C08K 5/101*     (2006.01)

(52) U.S. Cl.
CPC ..... *B32B 2457/20* (2013.01); *B32B 2457/202* (2013.01); *C08K 5/0091* (2013.01); *C08K 5/101* (2013.01); *C09J 5/06* (2013.01); *C09J 7/35* (2018.01); *C09J 2203/318* (2013.01); *C09J 2203/326* (2013.01); *C09J 2205/102* (2013.01); *C09J 2400/163* (2013.01); *C09J 2400/263* (2013.01); *C09J 2423/046* (2013.01); *C09J 2425/00* (2013.01); *C09J 2433/00* (2013.01); *C09J 2433/006* (2013.01); *C09J 2463/00* (2013.01); *C09J 2467/006* (2013.01); *C09J 2469/006* (2013.01); *C09J 2475/00* (2013.01); *C09J 2475/006* (2013.01); *Y10T 428/10* (2015.01); *Y10T 428/1059* (2015.01); *Y10T 428/1086* (2015.01)

(58) Field of Classification Search
CPC ............ C09J 2475/006; C09J 2469/006; C09J 2467/006; C09J 2433/00; C09J 2433/006; C09J 2423/046; C09J 2400/263; C09J 2400/163; C09J 2205/102; C09J 2203/326; C09J 2425/00; C09J 2463/00; B32B 2457/20; B32B 2457/202; Y10T 428/10; Y10T 428/1059; Y10T 428/1086; C08K 5/0091; C08K 5/101
See application file for complete search history.

(56) References Cited

U.S. PATENT DOCUMENTS

2012/0325402 A1\* 12/2012 Suwa ................. B32B 37/1207
    156/275.5
2013/0158199 A1\* 6/2013 Iseki ................... C09J 133/066
    525/123
2015/0017427 A1\* 1/2015 Ma ........................... B32B 7/12
    428/327

\* cited by examiner

THERMO-REVERSIBLE ADHESIVE COMPOSITION AND THERMO-REVERSIBLE ADHESIVE SHEET COMPRISING THE SAME

CLAIM OF PRIORITY

This application claims priority from and the benefit under 35 U.S.C. § 119(a) of Korean Patent Application No. 10-2015-0133424, filed on Sep. 21, 2015, which is hereby incorporated by reference for all purposes as if fully set forth herein.

BACKGROUND

1. Field of the Disclosure

Various embodiments of the present disclosure relate to a thermo-reversible adhesive composition, a thermo-reversible adhesive sheet including the same, and an electronic device including the same.

2. Description of the Prior Art

With the recent development of portable communication devices, the parts that are held in the portable communication devices are diversified and down-sized, and in order to fix these parts within the devices without occupying separate spaces for fixation, the binding and fixing between a device and a part and between a part and a part are achieved by using a member that provides adhesive strength to both surfaces, such as a double-sided tape between adjacent parts.

Conventional members for providing double-sided adhesive strength, such as a double-sided tape, fix parts through strong adhesive strength in order to strengthen the parts without using mechanical binding structures, instead of saving spaces for fixing the parts.

In addition, recent portable communication devices have an embedded type battery pack but not a substitution type battery pack, and when the battery pack is embedded in the portable communication device, the conventional member of providing double-sided adhesive strength is attached in order to prevent the damage to the battery pack that may result from the movement and impact of the battery pack.

SUMMARY

However, the conventional member of providing double-sided adhesive strength may frequently cause damage to parts due to strong adhesive strength thereof when the reassembly and disassembly of parts are conducted for the reason of defective adhesion to the parts and the exchange or repair of the parts. Alternatively, damage to the member may also cause a loss of adhesive strength, thereby making it difficult to reuse the parts. When a particular part is exchanged, the strong adhesive strength of the member may cause a problem in that parts adjacent to the member need to all be exchanged.

In order to overcome these problems, the adhesive strength of the member of providing double-sided adhesive strength can be weakened, but in this case, the fixing strength between parts may be degraded, causing the deterioration in the reliability of the product. Accordingly, the need exists for new adhesives.

According to aspects of the disclosure, a thermo-reversible adhesive composition is provided containing a base resin, methyl acetoacetate, and a metal-organic complex compound having the formula $M(X)_n(R)_o$, wherein: M is a metal selected from the group consisting of aluminum, iron, and nickel, X is acetylacetonate, R is $H_2O$, n is an integer equal to 2 or 3, and o is an integer greater than or equal to 0 and less than or equal to 2, such that n+o is equal to 3 or 4.

According to aspects of the disclosure, an adhesive sheet is provided comprising a first adhesive layer including the above-described thermo-reversible adhesive composition.

According to aspects of the disclosure, an adhesive sheet is provided, comprising: a first adhesive layer; a second adhesive layer; and a substrate, wherein the first adhesive layer includes the above-described thermo-reversible adhesive composition, and wherein the first adhesive layer is disposed on a first surface of the substrate, and the second adhesive layer is disposed on a second surface of the substrate that is opposite to the first surface.

According to aspects of the disclosure, an electronic device is provided, comprising: a housing including a first plate, and a second plate facing the first plate; a first part disposed between the first plate and the second plate inside the housing, the first part including a first surface facing the first plate and a second surface facing the second plate; a second part disposed between the first surface and the second surface; and an adhesive sheet disposed between the first part and the second part, the adhesive sheet including a first adhesive layer, a second adhesive layer, and a substrate, wherein the first adhesive layer includes the above-described thermo-reversible adhesive composition, and wherein the first adhesive layer and the second adhesive layer are disposed on opposite surfaces of the substrate.

BRIEF DESCRIPTION OF THE DRAWINGS

The above features and advantages of the present disclosure will be more apparent from the following detailed description in conjunction with the accompanying drawings, in which.

DETAILED DESCRIPTION

Figure 1:
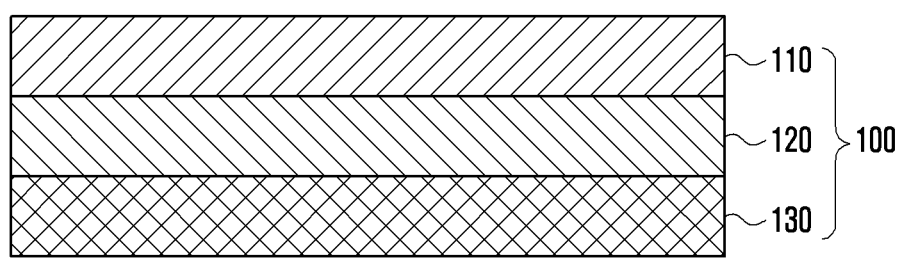
FIG. 1 is a diagram of an example of an adhesive sheet, according to an embodiment of the present disclosure.

Hereinafter, a thermo-reversible adhesive composition according to an embodiment of the present disclosure will be described in detail.

Base Resin

In an embodiment of the present disclosure, the thermo-reversible adhesive composition may contain a base resin. The base resin may have a weight average molecular weight of 700,000 to 1,000,000.

In an embodiment of the present disclosure, the base resin may include at least one of an acryl-based resin, a urethane-based resin, an epoxy-based resin, and a styrene isoprene-based resin.

In an embodiment of the present disclosure, the acryl-based resin may be a copolymer of a (meth) acrylic acid ester-based monomer and a cross-linkable functional group containing monomer.

The (meth)acrylic acid ester-based monomer may be an alkyl (meth)acrylate. For example, the alkyl (meth)acrylate is a (meth)acrylic acid ester-based monomer having a $C_1$-$C_{12}$ alkyl group, and may be at least one selected from the group consisting of pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethylhexyl (meth)acrylate, dodecyl (meth)acrylate, and decyl (meth)acrylate, but is not limited thereto.

According to an embodiment, the cross-linkage functional group-containing monomer may be at least one selected from the group consisting of a hydroxy group-containing monomer, a carboxy group-containing monomer, and a nitrogen-containing monomer. For example, the hydroxy group-containing compound may be 2-hydroxyethyl (meth)acrylate or 2-hydroxypropyl (meth)acrylate; the carboxy group-containing compound may be (meth)acrylic acid; and the nitrogen-containing monomer may be (meth)acrylonitrile, N-vinyl pyrrolidone, or N-vinyl caprolactam. However, they are not limited thereto.

In an embodiment of the present disclosure, the epoxy-based resin may have an average epoxy equivalent of 180 to 1,000. For example, the epoxy-based resin may be one or more of bi-functional epoxy resins, such as a bisphenol A epoxy resin or a bisphenol F epoxy resin; and multi-functional epoxy resins having three or more functional groups, such as cresol novolac epoxy resins, phenol novolac epoxy resins, 4-functional epoxy resins, biphenyl type epoxy resins, tri-phenol methane type epoxy resins, alkyl-modified triphenol methane type epoxy resins, naphthalene type epoxy resins, dicyclopentadiene type epoxy resins, and dicyclopentadiene-modified phenol type epoxy resins, but is not limited thereto.

In an embodiment of the present disclosure, the urethane-based resins may be hard polyurethane resins, soft polyurethane resins, and a mixture thereof. For example, the hard polyurethane resin is at least one of an adduct of a triol or a trimer using toluene diisocyanate, a trimer of hexamethylene diisocyanate or a resin obtained by a Biuret reaction, an adduct of a triol or a trimer of isophoron diisocyanate, and an adduct resin of a triol or a trimer of diphenyl methane diisocyanate, but is not limited thereto.

According to an embodiment, the soft polyurethane resin may be obtained by a reaction of an alcohol compound and an isocyanate-based compound. For example, the alcohol compound may be at least one selected from the group consisting of polyether polyols, polyester polyols, neopentyl glycols, methyl propane diol, hexane diol, ethylene glycol, propylene glycol, butylene glycol, butylene glycol, trimethylol propane, trimethylol ethane, and castor oil. The isocyanate-based compound may be at least one selected from the group consisting of toluene diisocyanate, hexamethylene diisocyanate, isophorone diisocyanate, and diphenyl methane diisocyanate, but is not limited thereto.

In an embodiment of the present disclosure, the styrene isoprene-based resin may be a styrene isoprene diblock copolymer, a styrene isoprene triblock copolymer, a hydrogenated styrene-butadiene diblock copolymer, a hydrogenated styrene butadiene triblock copolymer, a hydrogenated styrene isoprene diblock copolymer, a hydrogenated styrene isoprene triblock copolymer, or a hydrogenated styrene butadiene random copolymer, but is not limited thereto. The styrene block may contain, besides styrene, a copolymer of aromatic vinyl compounds, such as styrene and α-methyl styrene, but is not limited thereto.

Metal-Organic Complex Compound

The thermo-reversible adhesive composition, according to an embodiment of the present disclosure, may contain a metal-organic complex compound represented by the Chemical formula 1 below:

  [Chemical formula 1]

wherein, M is at least one metal selected from the group consisting of aluminum, iron, and nickel; X is acetylacetonate; R is $H_2O$; n is an integer of 2 or 3; o is an integer of 0 to 2; and n+o is 3 or 4.

In the metal-organic complex compound, the metal represented by M and the acetylacetonate may form a chelate structure.

In an embodiment of the present disclosure, the metal-organic complex compound may be at least one selected from the group consisting of aluminum acetylacetonate, iron acetylacetonate, and nickel acetylacetonate. The aluminum acetylacetonate may be represented by the Chemical formula 2 below; the iron acetylacetonate may be represented by the Chemical formula 3 below; and the nickel acetylacetonate may be represented by the Chemical formula 4 below.

  [Chemical formula 2]

  [Chemical formula 3]

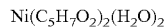  [Chemical formula 4]

At room temperature, the metal-organic complex compound can improve the cohesion of the resin in the composition, thereby enhancing binding strength with an adherend. Alternatively, at a particular high temperature range, deviating from room temperature, the metal bound to the chelate structure thermally expands, causing the deterioration in the cohesion of the resin, thereby facilitating disassembly from the adherend.

In an embodiment of the present disclosure, the content of the metal-organic complex compound may be in the range of 0.1 to 2 parts by weight per 100 parts by weight of the base resin. For example, less than 0.1 parts by weight of the metal-organic complex compound may result in weakening the effect of controlling the cohesive strength of the resin in the composition, and more than 2 parts by weight of the metal-organic complex compound may result in weakly increasing the effect of controlling the cohesive strength of the resin.

Methyl Acetoacetate

The thermo-reversible adhesive composition according to an embodiment of the present disclosure may contain methyl acetoacetate. The methyl acetoacetate delays the curing of the metal-organic complex compound to induce a uniform expansion of the metal-organic complex compound at a high temperature, thereby facilitating the removal of any substrate, which has been attached via the thermo-reversible adhesive composition, at a high temperature.

In an embodiment of the present disclosure, the content of the methyl acetoacetate may be in the range of 0.5 to 1 part by weight per 100 parts by weight of the base resin. For example, less than 0.5 parts by weight of the methyl acetoacetate may result in weakening the effect of promoting the dispersion of the metal-organic complex compound, and more than 1 part by weight of the methyl acetoacetate may result in a reduction of the binding strength of the metal-organic complex compound, which may in turn cause a reduction in the adhesive strength of the composition.

Alkyl Ammonium-Based Surfactant

In an embodiment of the present disclosure, the thermo-reversible adhesive composition may further contain an alkyl ammonium-based surfactant represented by the Chemical formula 5 below. The alkyl ammonium-based surfactant promotes the dispersion of the metal-organic complex compound in the composition to induce a uniform expansion of the metal-organic complex compound at a high temperature, thereby facilitating the removal of any substrate, which has been attached via the thermo-reversible adhesive composition, at a high temperature.

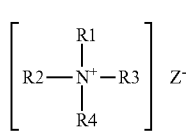

[Chemical formula 5]

In the Chemical formula 5, R1 to R4 each are independently a straight or branched chain $C_1$-$C_{10}$ alkyl group; $Z^-$ may be at least one negative ion selected from fluorine, bromine, chlorine, iodine, sulfate, sulfite, nitrate, and nitrite.

In an embodiment of the present disclosure, the alkyl ammonium-based surfactant may be at least one selected from the group consisting of cetyl trimethyl ammonium fluoride, cetyl trimethyl ammonium chloride, cetyl trimethyl ammonium bromide, and cetyl trimethyl ammonium iodide.

In an embodiment of the present disclosure, the content of the alkyl ammonium-based surfactant may be in the range of 0.5 to 2 parts by weight per 100 parts by weight of the base resin. For example, less than 0.5 parts by weight of the alkyl ammonium-based surfactant may result in weakening the effect of promoting the dispersion of the metal-organic complex compound in the composition, and more than 2 parts by weight of the metal-organic complex compound may result in a reduction of the binding strength of the metal-organic complex compound, which may in turn cause a reduction in the adhesive strength of the composition.

Conductive Powder

In an embodiment of the present disclosure, the thermo-reversible adhesive composition may further contain a conductive powder. Any suitable type of conductive powder may be used that is capable of creating an electrical connection between the substrate and the surface of the adhesive layer. For example, the conductive powder may be at least one selected from the group consisting of nickel, copper, iron, and an alloy thereof. Alternatively, the conductive powder may be nickel which can be used to form an organic compound in the composition, prevents reductions in conductivity and adhesive strength, has low electric resistance, and has an excellent reversible adhesive performance due to having a high coefficient of thermal expansion.

In an embodiment of the present disclosure, the content of the conductive powder may be in the range of 2 to 10 parts by weight per 100 parts by weight of the base resin. For example, less than 2 parts by weight of the conductive powder results in weakening the conductivity of the composition, and more than 10 parts by weight of the conductive powder may result in a degradation or loss of adhesive strength of the composition when the composition is exposed to a high temperature, due to low heat capacity thereof.

Adhesive Sheet

Hereinafter, an adhesive sheet according to an embodiment of the present disclosure will be described in detail.

According to aspects of the disclosure, the adhesive sheet may be arranged either as a tape of which the length in one of the length direction and the width direction is longer than that in the other, or a sheet, of which the length in the length direction is equal to the length in the width direction or the difference in the ratio therebetween is not great. In instances in which the adhesive sheet includes a first adhesive layer according to the present disclosure, the shape of the adhesive sheet may be the same or different from the shape of the first adhesive layer.

The adhesive sheet according to an embodiment of the present disclosure may include a first adhesive layer.

Referring to FIG. 1, an adhesive sheet 100 according to an embodiment of the present disclosure may include a first adhesive layer 110; a second adhesive layer 130; and a substrate 120. The first adhesive layer 110 may include the thermo-reversible adhesive composition. The first adhesive layer 110 may be disposed on one surface of the substrate 120, and a second adhesive layer 130 may be disposed on the other surface of the substrate 120.

First Adhesive Layer

The adhesive sheet according to an embodiment of the present disclosure may include a first adhesive layer including the foregoing thermo-reversible adhesive composition.

In an embodiment of the present disclosure, the adhesive strength of the first adhesive layer may be 1400 gf/mm or higher at a temperature of 25° C. to 50° C. For example, if the adhesive strength of the first adhesive layer is lower than 1400 gf/mm at a temperature of 25° C. to 50° C., the first adhesive layer cannot provide sufficient adhesive strength to an adherend.

According to aspects of the disclosure, in view of providing adhesive strength to an adherend, the upper limit of the adhesive strength of the first adhesive layer may not be particularly limited at a temperature of 25° C. to 50° C. In an embodiment of the present disclosure, the adhesive strength of the first adhesive layer at a temperature of 25° C. to 50° C. may be 2800 gf/mm or lower, 2000 gf/mm or lower, or 1800 gf/mm or lower, in consideration of the variability of adhesive strength at temperatures that are higher than room temperature.

In an embodiment of the present disclosure, the adhesive strength of the first adhesive layer may be in the range of 150 gf/mm to 1000 gf/mm at a temperature of 65° C. to 80° C.

In an embodiment of the present disclosure, the adhesive strength of the first adhesive layer may be in the range of 1400 gf/mm to 2800 gf/mm at a temperature of 25° C. to 50° C., and may be in the range of 500 gf/mm to 1000 gf/mm at a temperature of 65° C. to 80° C.

In an embodiment of the present disclosure, the adhesive strength of the first adhesive layer may be in the range of 1400 gf/mm to 2000 gf/mm at a temperature of 25° C. to 50°

C., and may be in the range of 300 gf/mm to 1000 gf/mm at a temperature of 65° C. to 80° C.

In an embodiment of the present disclosure, the adhesive strength of the first adhesive layer may be in the range of 1400 gf/mm to 1800 gf/mm at a temperature of 25° C. to 50° C., and may be in the range of 150 gf/mm to 1000 gf/mm at a temperature of 65° C. to 80° C.

In addition, another embodiment of the adhesive strength of the first adhesive layer of the present disclosure may also be possible.

In an embodiment of the present disclosure, the thickness of the first adhesive layer may be 5 μm or more. In another embodiment, the thickness of the first adhesive layer may be 100 μm or less. Additionally or alternatively, the thickness of the first adhesive layer may be in the range of 5 to 100 μm.

In another view of the adhesive sheet according to a second aspect of the present disclosure, the adhesive sheet may further include a second adhesive layer and a substrate.

Second Adhesive Layer

In an embodiment of the present disclosure, the second adhesive layer may be formed of the foregoing thermo-reversible adhesive composition or any other suitable type of adhesive composition.

In an embodiment of the present disclosure, the second adhesive layer may be formed of an acrylic two-component cross-linkable polymer, but is not limited thereto.

For example, the acrylic two-component cross-linkable polymer may be one in which an acryl polymer is cross-linked by a curing agent. The curing agent may be an isocyanate curing agent, but is not limited thereto.

According to an embodiment, the molecular weight of the acrylic two-component cross-linkable polymer may be less than 10,000,000.

According to an embodiment, the acrylic two-component cross-linkable polymer may be a polymer that has a non-cross-linkable acryl monomer unit and a cross-linkable unit. The acryl monomer may be a monomer having an acryloyl group or a methacryloyl group.

The isocyanate curing agent may be, for example, tolylene diisocyanate, xylene diisocyanate, hexamethylene diisocyanate, isophorone diisocyanate, or the like.

Substrate

In an embodiment of the present disclosure, the substrate 110 may be at least one of polyethylene terephthalate (PET), poly(methylmethacrylate) (PMMA), polycarbonate (PC), polyurethane (PU), polyethylene (PE), a fabric, a copper (Cu) sheet, and an aluminum (Al) sheet. The polyurethane or the polyethylene may be in the form of a foam. The fabric may be either a woven fabric or a non-woven fabric. For example, the fabric may include one or more of a chemically, mechanically, thermally, or solvent-treated non-woven fabric. In some implementations, a metal, such as copper or aluminum, may be deposited on the fabric.

Electronic Device

Hereinafter, an electronic device according to an embodiment of the present disclosure will be described in detail.

In an embodiment of the present disclosure, the electronic device may include any suitable type of electronic devices, such as a smartphone, a cell phone, a multimedia device, as a video telephone, an e-book reader, a laptop personal computer (PC), a netbook computer, a personal digital assistant (PDA), a portable multimedia player (PMP), an MPEG-1 audio layer-3 (MP3) player, a mobile medical device, a camera, a wearable device (e.g., a head-mounted device (HMD) such as electronic glasses, electronic clothing, an electronic bracelet, an electronic necklace, an electronic appcessory, an electronic tattoo, or a smart watch), and the like.

In an embodiment of the present disclosure, the electronic device may be a smart home appliance. The smart home appliance, for example, may include at least one of a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a gaming console, an electronic dictionary, an electronic key, a camcorder, and an electronic picture frame.

In an embodiment of the present disclosure, the electronic device may include at least one of a medical appliance (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) terminal.

In an embodiment of the present disclosure, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like).

An electronic device according to various embodiments of the present disclosure may be a combination of one or more of the above-described devices. Also, an electronic device according to various embodiments of the present disclosure may be a flexible device. Also, an electronic device according to various embodiments of the present disclosure is not limited to the above-described examples.

Figure 2:
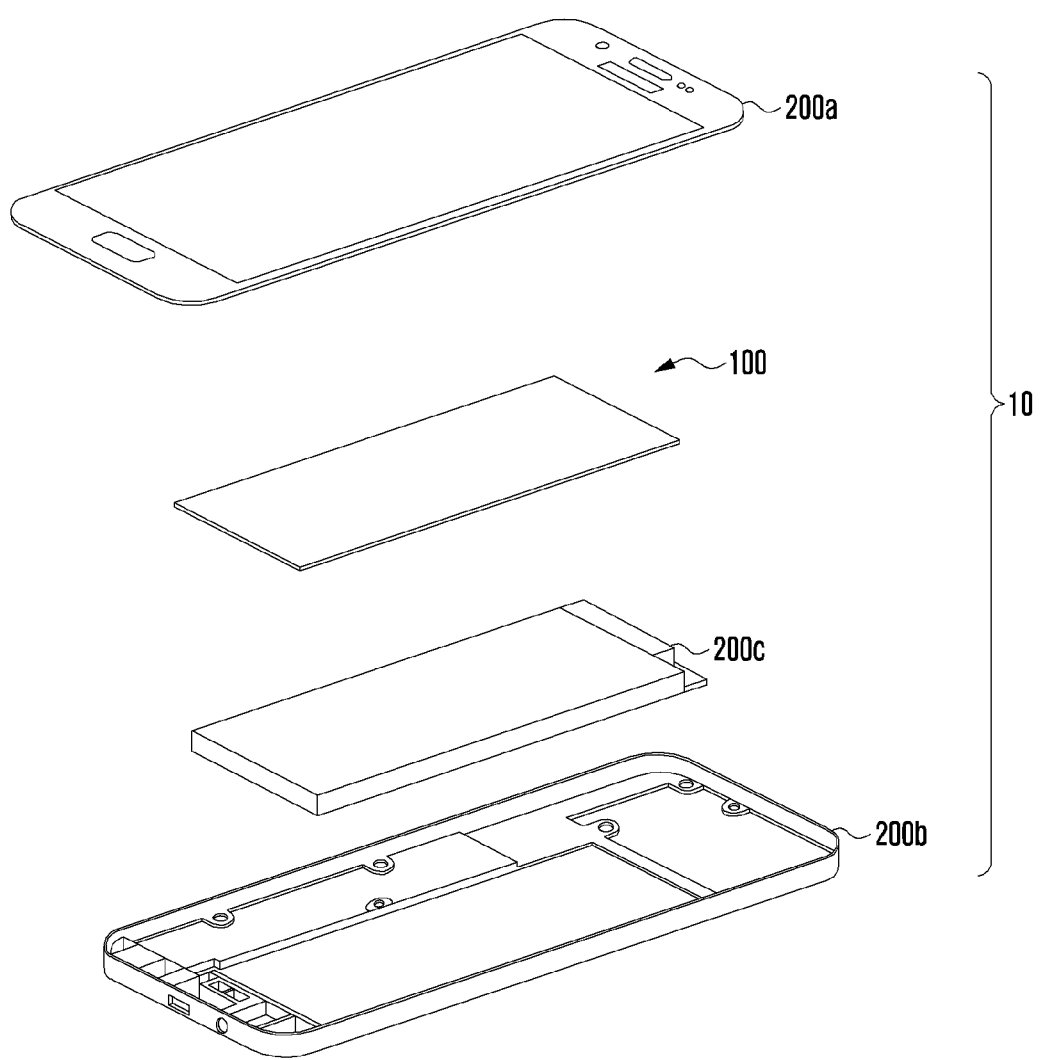
FIG. 2 is a diagram of an example of an electronic device, according to an embodiment of the present disclosure.

According to various embodiments of the present disclosure, referring to FIG. 2, the electronic device 10 may include: an external housing including a first plate 200a and a second plate 200b which face each other. A first part may be disposed between the first plate 200a and the second plate 200b inside the external housing. The first part may include a first surface facing the first plate 200a and a second surface facing the second plate 200b. A second part may be disposed between the first and second plates and between the first and second surfaces of the first part. Finally, the adhesive sheet 100 may be placed between the first part and the second part.

In an embodiment of the present disclosure, the first plate 200a and the second plate 200b may be either separate from one another or integral. In instances in which the plates are separate from one another, the plates 200a and 200b may be connected by using any suitable type of connection. In other words, the type of the connection used to couple the first plate 200a and the second plate 200b is not limited to any particular type as long as the plates can be coupled to form the housing.

The part 200c may include any suitable type of electronic or mechanical component of the electronic device 10, such as a window, a rear cover, a display module, a flexible display, a liquid crystal display (LCD), a support frame, or a battery pack.

Figure 3:
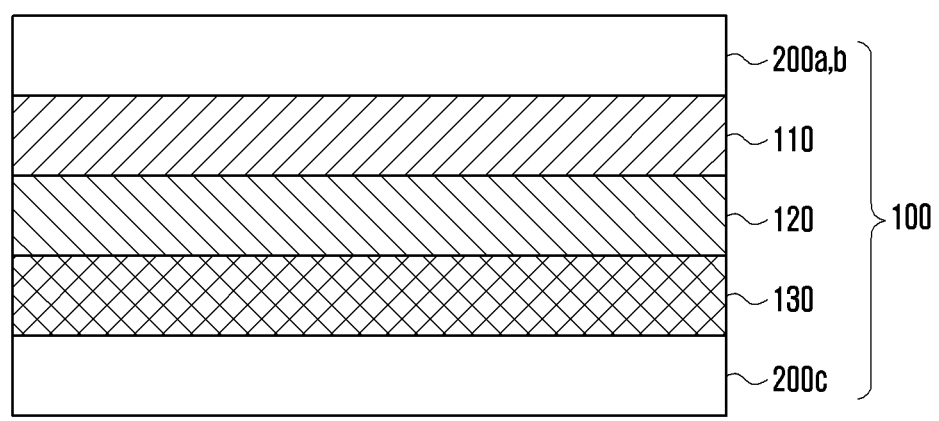
FIG. 3 is a diagram illustrating an example of the usage of the adhesive sheet of FIG. 1, according to an embodiment of the present disclosure.

In an embodiment of the present disclosure, referring to FIG. 3, the first adhesive layer 110 may be in contact with at least a portion of the second plate 200b or at least a portion of the first plate 200a, and the second adhesive layer 130 may be in contact with at least a portion of the part 200c.

Figure 4:
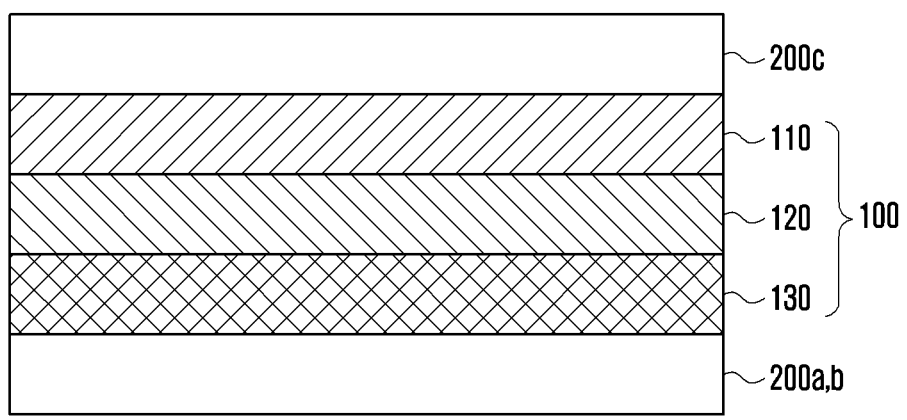
FIG. 4 is a diagram illustrating an example of the usage of the adhesive sheet of FIG. 1, according to an embodiment of the present disclosure.

In an embodiment of the present disclosure, referring to FIG. 4, the first adhesive layer 110 may be in contact with at least a portion of the part 200c and, the second adhesive layer 130 may be in contact with at least a portion of the second plate 200b or at least a portion of the first plate 200a.

Figure 5:
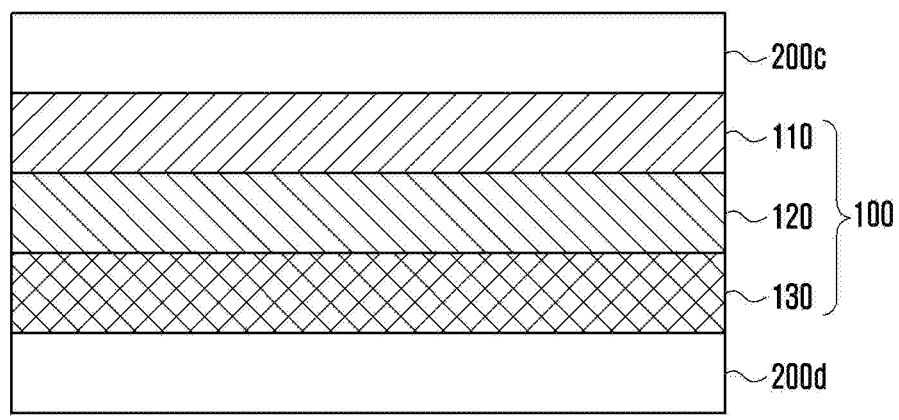
FIG. 5 is a diagram illustrating an example of the usage of the adhesive sheet of FIG. 1, according to an embodiment of the present disclosure.

In an embodiment of the present disclosure, referring to FIG. 5, the first adhesive layer 110 may be in contact with a portion of the part 200c, and the second adhesive layer 130 may be in contact with a part 200d. In some implementations, the parts 200c and 200d may be different portions of the same module of the electronic device (e.g., an assembly that is secured to the housing as one unit). Additionally or alternatively, in some implementations, the parts 200c and 200d may be different parts that do not form the same module.

According to various embodiments of the present disclosure, in instances in which the part 200c, which is contact with and adheres to the first adhesive layer 110 or the second adhesive layer 130, is disassembled, the adhesive strength of the first adhesive layer 110 or the second adhesive layer 120 may be degraded by applying heat thereto within the temperature range in which the change in adhesive strength of the first adhesive layer 110 or the second adhesive layer 120 occurs, thereby achieving the disassembly of the part 200c while minimizing or altogether avoiding any damage to the part 200c.

Hereinafter, aspects of the present disclosure will be described in detail with reference to examples. However, these examples are provided merely for illustrative purposes, and thus the scope of the present disclosure is not limited by them.

PREPARATIVE EXAMPLE 1

Preparation of Thermo-Reversible Adhesive Composition

Thermo-reversible adhesive compositions of Examples 1-1 to 1-10, Examples 2-1 to 2-10, Examples 3-1 to 3-10, Examples 4-1 to 4-6, Examples 5-1 to 5-6, and Comparative examples 1 to 10 were prepared by mixing ingredients according to compositions shown in tables 1 to 6 (unit: parts by weight per 100 parts by weight of a base resin) at a temperature of 25° C. for 2 to 3 hours by using a WiseStir™ magnetic stirrer, manufactured by Global Lab™, at 450 to 500 rpm.

The mixing was conducted by sequentially feeding a base resin, a metal-organic complex compound, an alkyl ammonium-based surfactant, methyl acetoacetate, and a conductive powder (according to each composition; when a corresponding ingredient was omitted, the feeding of the omitted ingredient was skipped).

TABLE 1

| Ingredients | | Example 1-1 | Example 1-2 | Example 1-3 | Example 1-4 | Example 1-5 | Example 1-6 | Example 1-7 | Example 1-8 | Example 1-9 | Example 1-10 |
|---|---|---|---|---|---|---|---|---|---|---|---|
| metal-organic complex compound | Aluminum Acetylacetonate 1) | 0.1 | 0.2 | 0.5 | 0.7 | 0.9 | 1.0 | 1.5 | 2.0 | 2.5 | 3.0 |
| | Methyl Acetoacetate 2) | 0.5 | 0.5 | 0.5 | 0.5 | 0.5 | 0.5 | 0.5 | 0.5 | 0.5 | 0.5 |
| | Alkyl Ammonium-Based Surfactant 3) | 0.1 | 0.5 | 1.0 | 0.1 | 0.5 | 1.0 | 0.1 | 0.5 | 1.0 | 1.5 |
| Conductiv Powder | Nickel Powder 4) | 4 | 4 | 4 | 4 | 4 | 4 | 4 | 4 | 4 | 4 |
| | Base Resin 5) | 100 | 100 | 100 | 100 | 100 | 100 | 100 | 100 | 100 | 100 |

1) BYK-Chemie corporation/AAA-3
2) SAMWON corporation/50E
3) BYK-Chemie corporation/BYK-6760
4) SIGMA-ALDRICH company/266965
5) BOSTIK KOREA company/H2211

TABLE 2

| Ingredients | | Example 2-1 | Example 2-2 | Example 2-3 | Example 2-4 | Example 2-5 | Example 2-6 | Example 2-7 | Example 2-8 | Example 2-9 | Example 2-10 |
|---|---|---|---|---|---|---|---|---|---|---|---|
| metal-organic complex compound | Iron Acetylacetonate 1) | 0.1 | 0.2 | 0.5 | 0.7 | 0.9 | 1.0 | 1.5 | 2.0 | 2.5 | 3.0 |
| | Methyl Acetoacetate 2) | 0.5 | 0.5 | 0.5 | 0.5 | 0.5 | 0.5 | 0.5 | 0.5 | 0.5 | 0.5 |
| | Alkyl Ammonium-Based Surfactant 3) | 0.1 | 0.5 | 1.0 | 0.1 | 0.5 | 1.0 | 0.1 | 0.5 | 1.0 | 1.5 |
| Conductiv Powder | Nickel Powder 4) | 4 | 4 | 4 | 4 | 4 | 4 | 4 | 4 | 4 | 4 |
| | Base Resin 5) | 100 | 100 | 100 | 100 | 100 | 100 | 100 | 100 | 100 | 100 |

1) BYK-Chemie corporation/AAA-3
2) SAMWON corporation/50E
3) BYK-Chemie corporation/BYK-6760
4) SIGMA-ALDRICH corporation/266965
5) BOSTIK KOREA corporation/H2211

TABLE 3

| Ingredients | | Example 3-1 | Example 3-2 | Example 3-3 | Example 3-4 | Example 3-5 | Example 3-6 | Example 3-7 | Example 3-8 | Example 3-9 | Example 3-10 |
|---|---|---|---|---|---|---|---|---|---|---|---|
| metal-organic complex compound | Nickel Acetylacetonate 1) | 0.1 | 0.2 | 0.5 | 0.7 | 0.9 | 1.0 | 1.5 | 2.0 | 2.5 | 3.0 |
| | Methyl Acetoacetate 2) | 0.5 | 0.5 | 0.5 | 0.5 | 0.5 | 0.5 | 0.5 | 0.5 | 0.5 | 0.5 |
| | Alkyl Ammonium-Based Surfactant 3) | 0.1 | 0.5 | 1.0 | 0.1 | 0.5 | 1.0 | 0.1 | 0.5 | 1.0 | 1.5 |
| Conductiv Powder | Nickel Powder 4) | 4 | 4 | 4 | 4 | 4 | 4 | 4 | 4 | 4 | 4 |
| | Base Resin 5) | 100 | 100 | 100 | 100 | 100 | 100 | 100 | 100 | 100 | 100 |

1) BYK-Chemie corporation/AAA-3
2) SAMWON corporation/50E
3) BYK-Chemie corporation/BYK-6760
4) SIGMA-ALDRICH corporation/266965
5) BOSTIK KOREA corporation/H2211

TABLE 4

| Ingredients | Comparative Example 1 | Comparative Example 2 | Comparative Example 3 | Comparative Example 4 | Comparative Example 5 |
|---|---|---|---|---|---|
| Methyl Acetoacetate 1) | 0.1 | 0.2 | 0.5 | 0.7 | 0.9 |
| Alkyl Ammonium-Based Surfactant 2) | 0.1 | 0.5 | 1.0 | 0.1 | 0.5 |
| Conductiv Powder Nickel Powder 3) | 4 | 4 | 4 | 4 | 4 |
| Base Resin 4) | 100 | 100 | 100 | 100 | 100 |

| Ingredients | Comparative Example 6 | Comparative Example 7 | Comparative Example 8 | Comparative Example 9 | Comparative Example 10 |
|---|---|---|---|---|---|
| Methyl Acetoacetate 1) | 1.0 | 1.5 | 2.0 | 2.5 | 3.0 |
| Alkyl Ammonium-Based Surfactant 2) | 1.0 | 0.1 | 0.5 | 1.0 | 1.5 |
| Conductiv Powder Nickel Powder 3) | 4 | 4 | 4 | 4 | 4 |
| Base Resin 4) | 100 | 100 | 100 | 100 | 100 |

1) SAMWON corporation/50E
2) BYK-Chemie corporation/BYK-6760
3) SIGMA-ALDRICH corporation/266965
4) BOSTIK KOREA corporation/H2211

TABLE 5

| Ingredients | | Example 4-1 | Example 4-2 | Example 4-3 | Example 4-4 | Example 4-5 | Example 4-6 |
|---|---|---|---|---|---|---|---|
| metal-organic complex compound | Aluminum Acetonate 1) | 0.5 | 1.5 | 1.5 | 0.5 | 1.5 | 1.5 |
| | Methyl Acetoacetate 2) | 0.5 | 0.5 | 0.5 | 0.5 | 0.5 | 0.5 |
| Alkyl Ammonium-Based Surfactant 3) | | — | — | 0.6 | — | — | 0.6 |
| Base Resin 4) | | 100 | 100 | 100 | 100 | 100 | 100 |

1) BYK-Chemie corporation/AAA-3
2) SAMWON corporation/50E
3) BYK-Chemie corporation/BYK-6760
4) BOSTIK KOREA corporation/H2211

TABLE 6

| Ingredients | | Example 5-1 | Example 5-2 | Example 5-3 | Example 5-4 | Example 5-5 | Example 5-6 |
|---|---|---|---|---|---|---|---|
| metal-organic complex compound | Aluminum Acetonate 1) | 1 | 1.3 | 1.5 | 1 | 1.3 | 1.5 |
| | Methyl Acetoacetate 2) | 0.5 | 0.5 | 0.5 | 0.5 | 0.5 | 0.5 |
| Alkyl Ammonium-Based Surfactant 3) | | 0.6 | 0.6 | 0.6 | 0.6 | 0.6 | 0.6 |
| Conductiv Powder | Nickel Powder 4) | 4 | 4 | 4 | 4 | 4 | 4 |
| | Base Resin 5) | 100 | 100 | 100 | 100 | 100 | 100 |

1) BYKcorporation/AAA-3
2) SAMWON corporation/50E
3) BYK-Chemie corporation/BYK-6760
4) SIGMA-ALDRICH corporation/266965
5) BOSTIK KOREA corporation/H2211

TEST EXAMPLE 1

Adhesive Strength Test (Room Temperature, High Temperature, and Returning to Room Temperature from High Temperature)

Measurement Method: KS T 1028AGS-X
Measurement Apparatus: AGS-X™ (product name) manufactured by Shimadzu Corporation™
Driving conditions for adhesive strength test in measurement apparatus: Shift an upward frame at 300±30 mm/min
Substrate: 25 mm (width)×150 mm (length) PET
Adherend: SUS 304 stainless steel
Adhesive layer: Coated on the substrate (Examples 4-1 to 4-3: 7 μm thick coated; and Examples 4-4 to 4-6: 10 μm thick coated)
Reciprocating compressing and rolling motion: Once reciprocating compressing with 2 kg rubber roller
Reciprocating compressing and rolling motion speed: 300 mm/min
Adhering time before test: 30 min
Each of the compositions of Examples 4-1 to 4-6 discussed with respect to Preparative example 1 was subjected to an adhesive strength test according to the measurement method under the measurement conditions, and the test will be described in detail below.

First, each of the thermo-reversible adhesive compositions discussed with respect to Preparative example 1 was coated on one surface of the substrate to have a thickness according to the foregoing condition, and then cut to size according to the foregoing condition.

The surface of the cut substrate, on which the thermo-reversible adhesive composition had been coated, was attached to the adherend.

Next, the reciprocating compressing and rolling motion was performed according to the foregoing condition to compress the substrate and the adherend.

Figure 10:
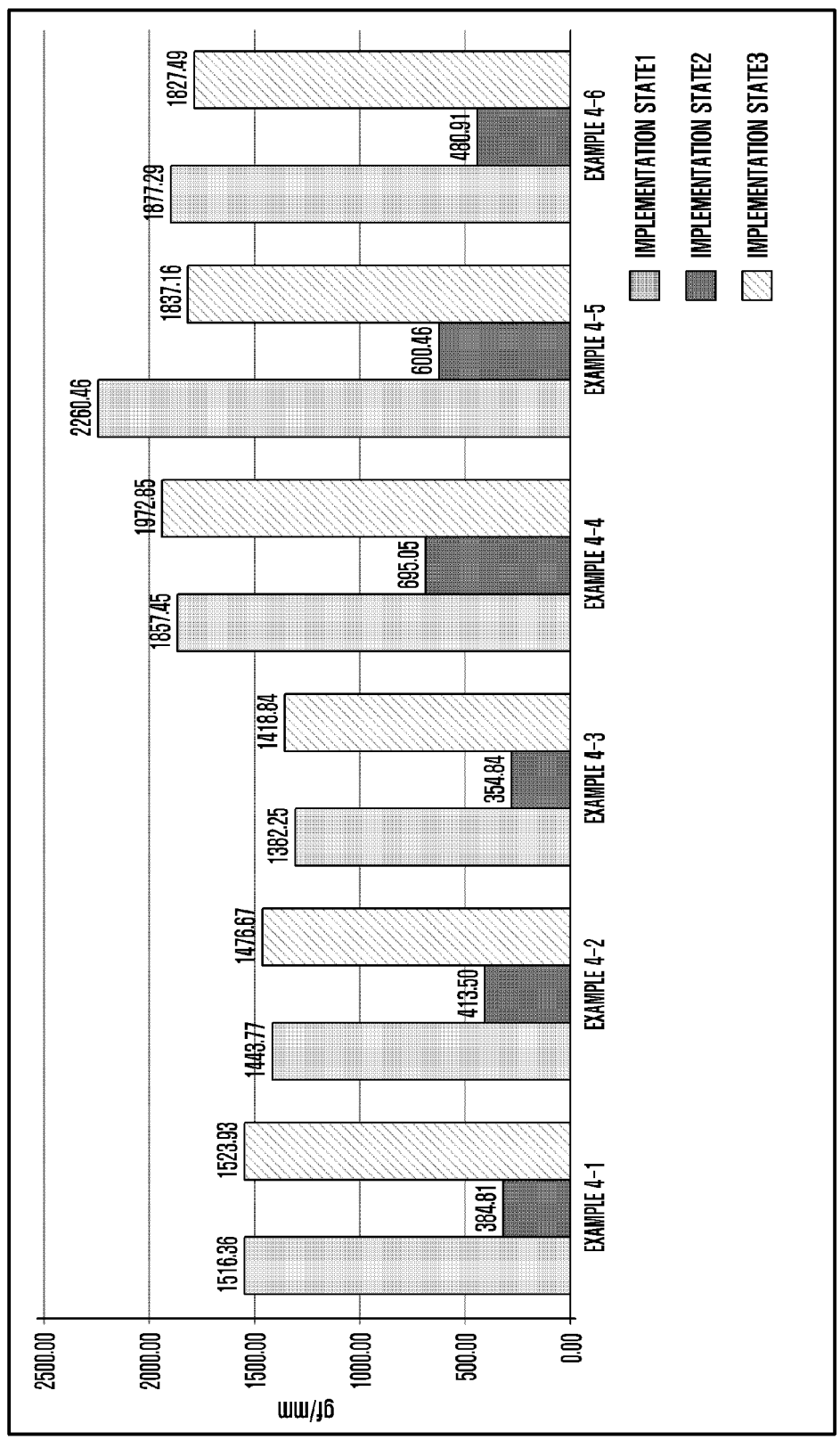
FIG. 10 is a graph showing the adhesive strengths of different adhesive examples, according to an embodiment of the present disclosure.
Figure 11:
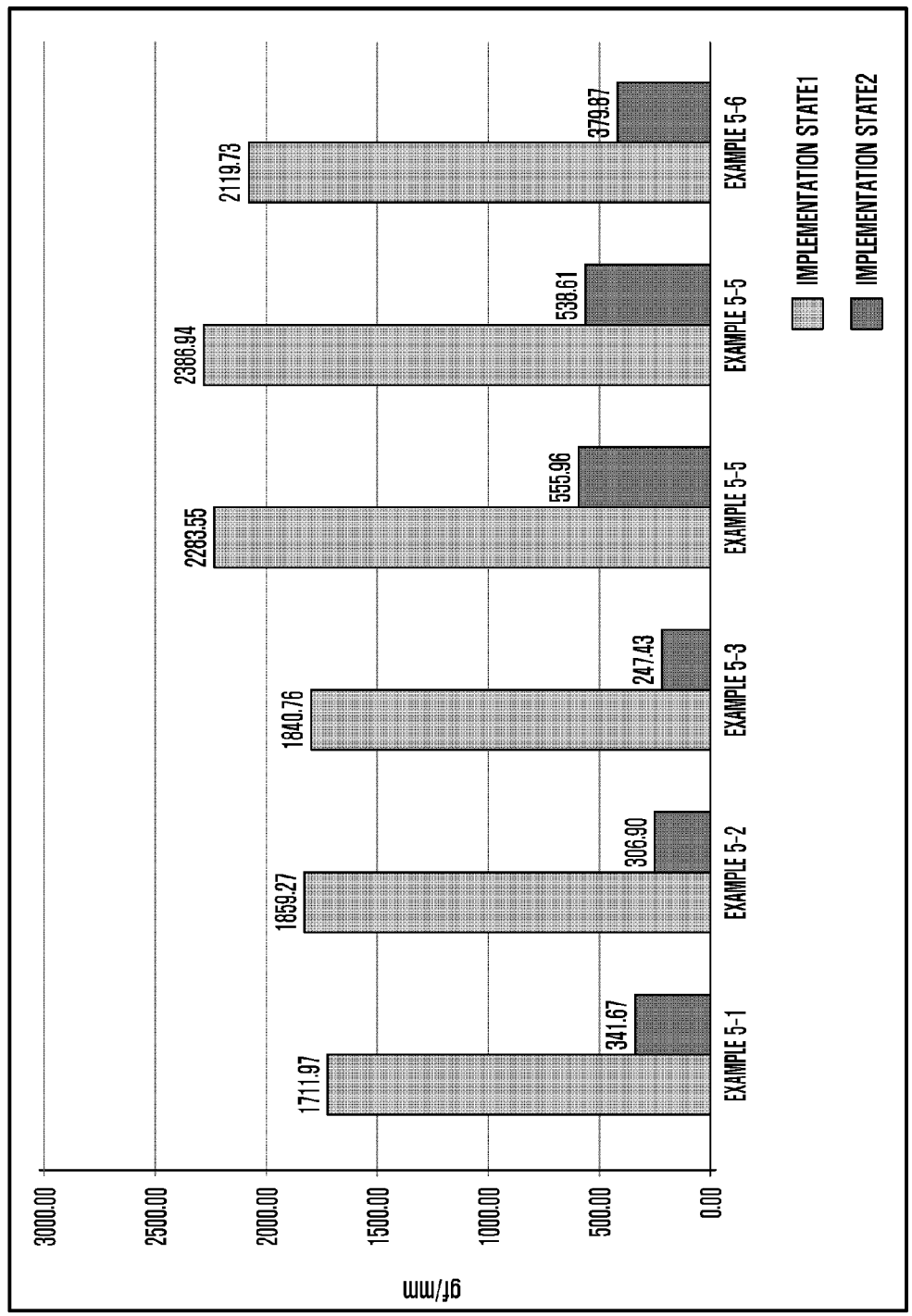
FIG. 11 is a graph showing the adhesive strengths of different adhesive examples, according to an embodiment of the present disclosure.

Next, the substrate was fixed to an upward frame of the measurement apparatus, and the adherend was fixed to a downward frame of the measurement apparatus, and then the adhesive strength was measured under the driving condition for the adhesive strength test of the measurement apparatus, sequentially following the measurement conditions of Implementation states 1 to 3. The measurement results are shown in FIG. 10.

Implementation state 1: Measure adhesive strength after the compressed substrate and adherend were left at 25° C. for 30 min
Implementation state 2: Measure adhesive strength after the compressed substrate and adherend were left at 70° C. for 10 min
Implementation state 3: Measure adhesive strength after the compressed substrate and adherend were again left at room temperature (25° C.) for 10 min Referring to FIG. 10, it can be verified that, as for the compositions of Examples 4-1 to 4-6, the adhesive strengths were lowered to levels, at which the adhering substrate and adherend could be separated without damage by using less effort at a high temperature as in Implementation state 2, and the adhesive strengths were restored to the equivalent, or higher than the equivalent, of the adhesive strengths before being exposed to a high temperature when the compositions were returned to room temperature after being exposed to the high temperature.

TEST EXAMPLE 2

Adhesive Strength Test (Room Temperature and High Temperature)

Adhesive layer: The compositions were coated on the substrates (Examples 5-1 to 5-3: 7 μm thick coated; Examples 1-1 to 1-10, 2-1 to 2-10, 3-1 to 3-10, and 5-4 to 5-6, and Comparative examples 1 to 10: 10 μm thick coated).

The adhesive test was conducted by the same method as in Test example 1 except for the conditions with respect to the adhesive layer. However, the measurement was conducted for only Implementation states 1 and 2, and the measurement results are shown in FIGS. 6-9 and 11.

Figure 6:
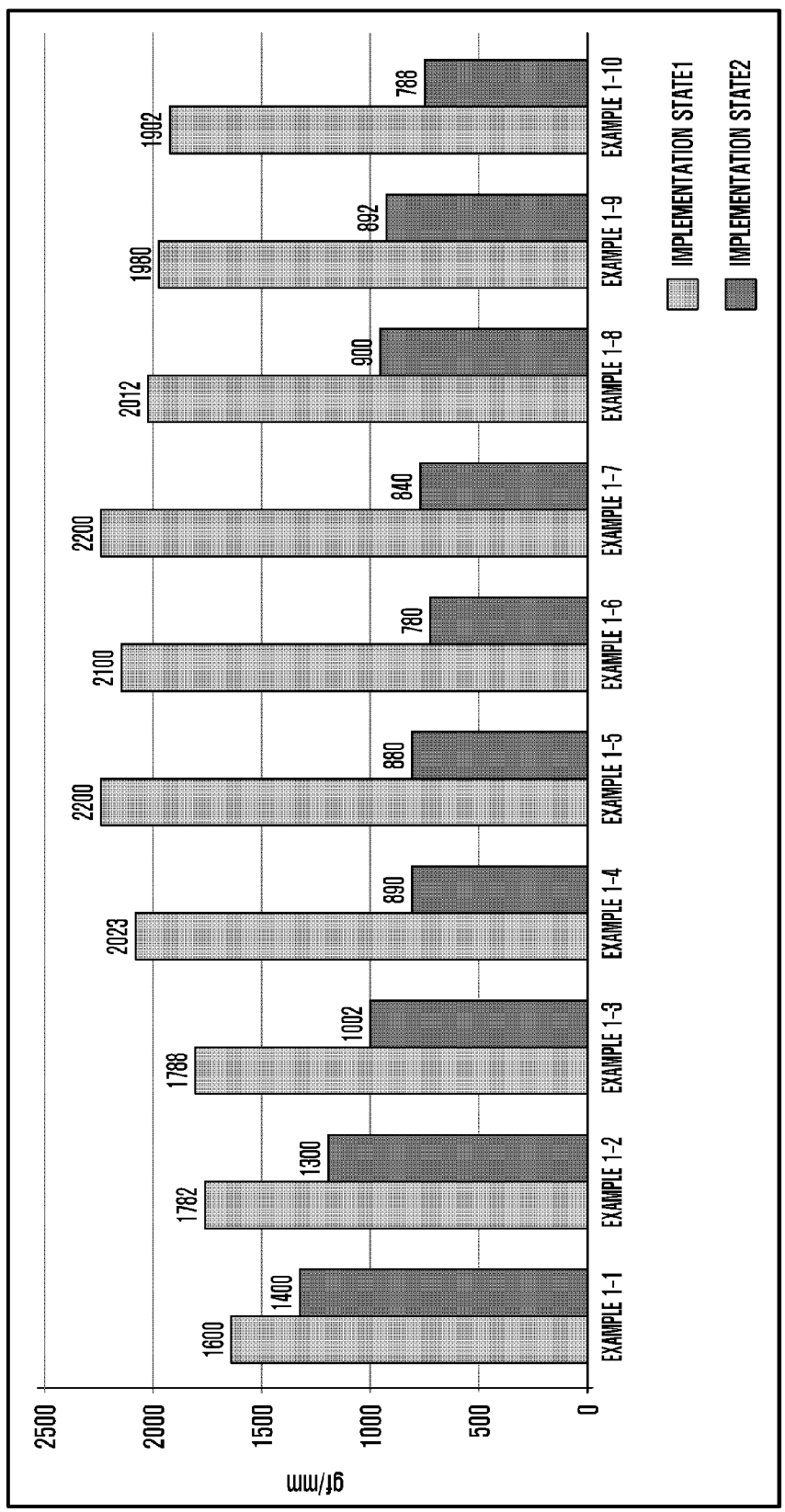
FIG. 6 is a graph showing the adhesive strengths of different adhesive examples, according to an embodiment of the present disclosure.
Figure 7:
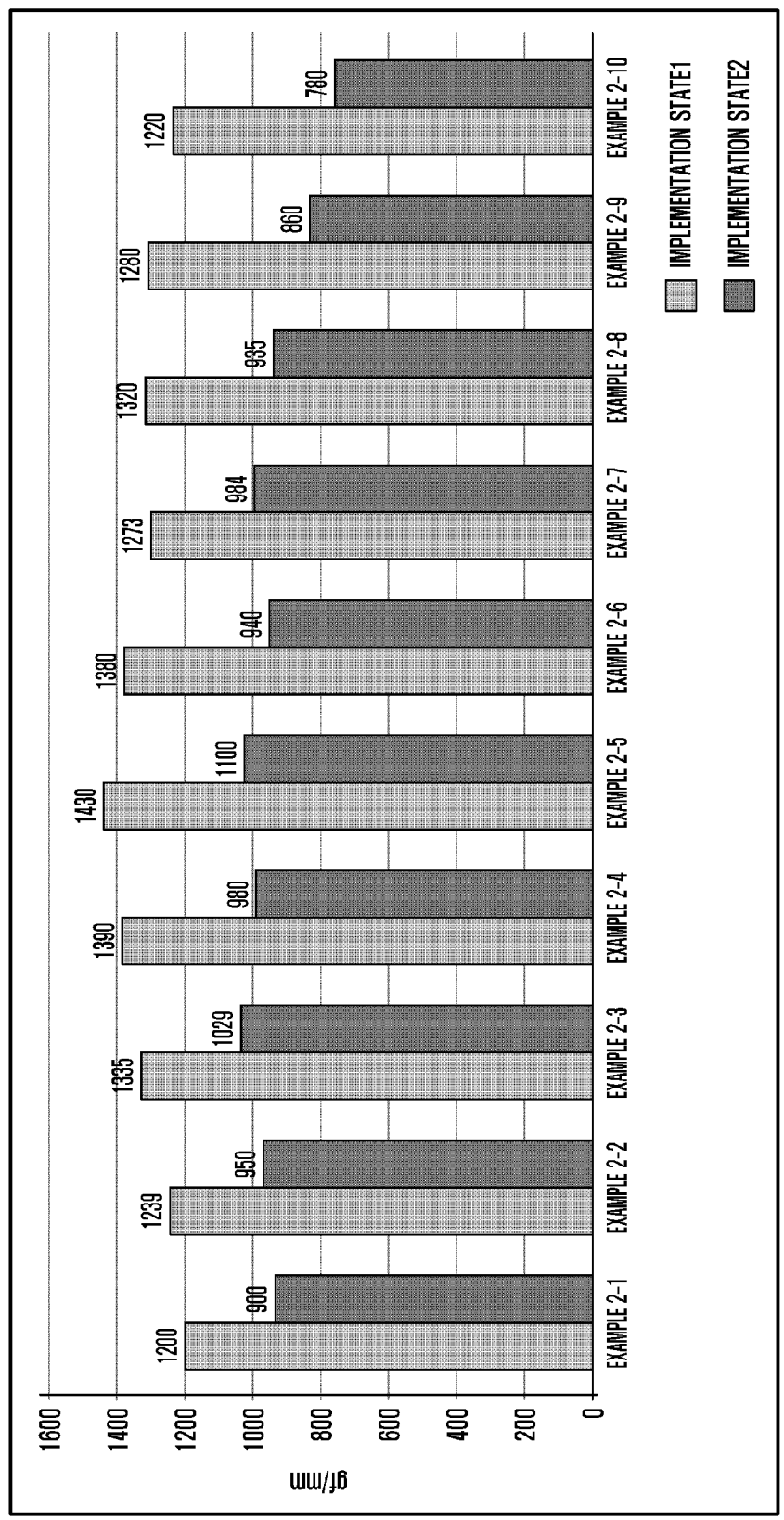
FIG. 7 is a graph showing the adhesive strengths of different adhesive examples, according to an embodiment of the present disclosure.
Figure 8:
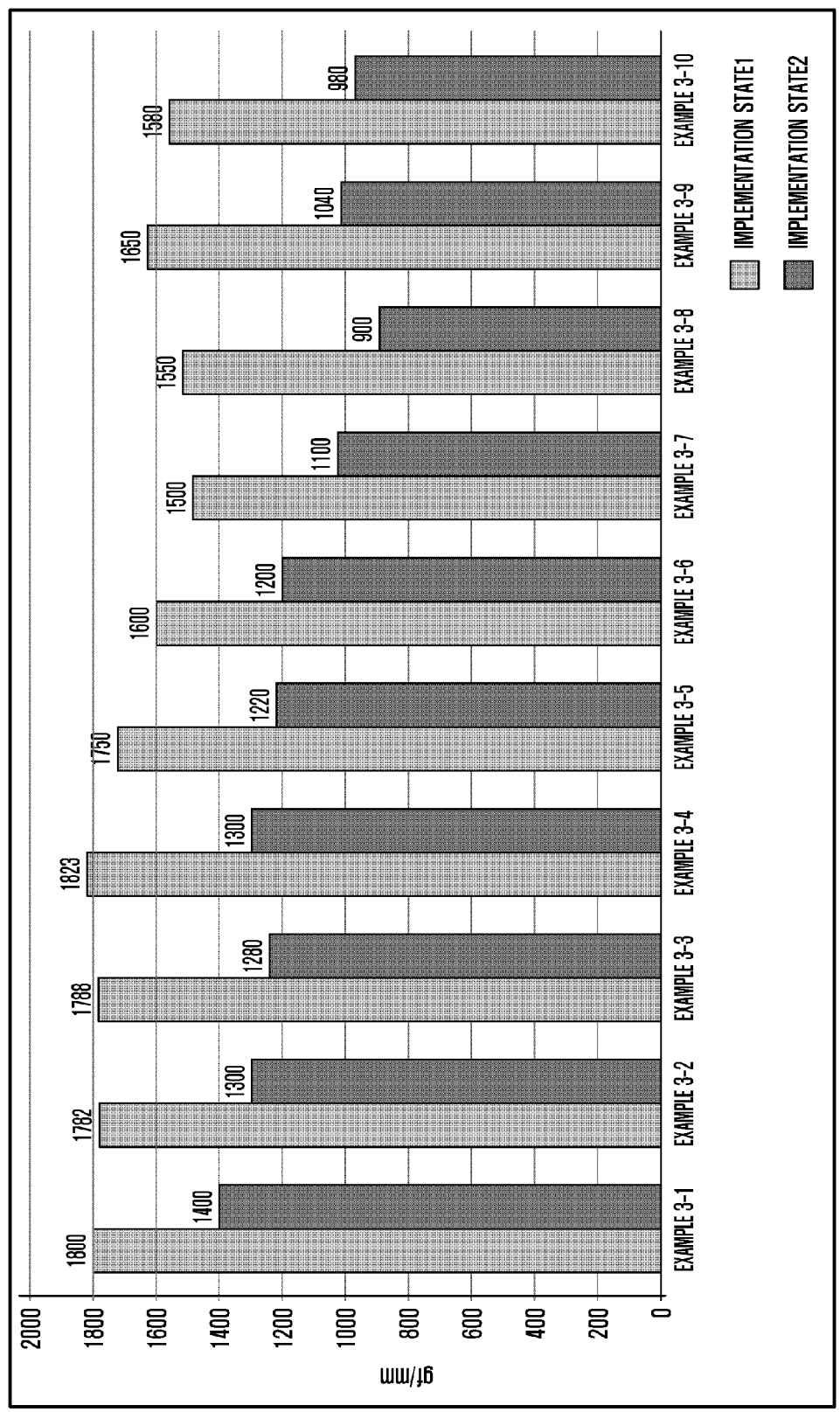
FIG. 8 is a graph showing the adhesive strengths of different adhesive examples, according to an embodiment of the present disclosure.
Figure 9:
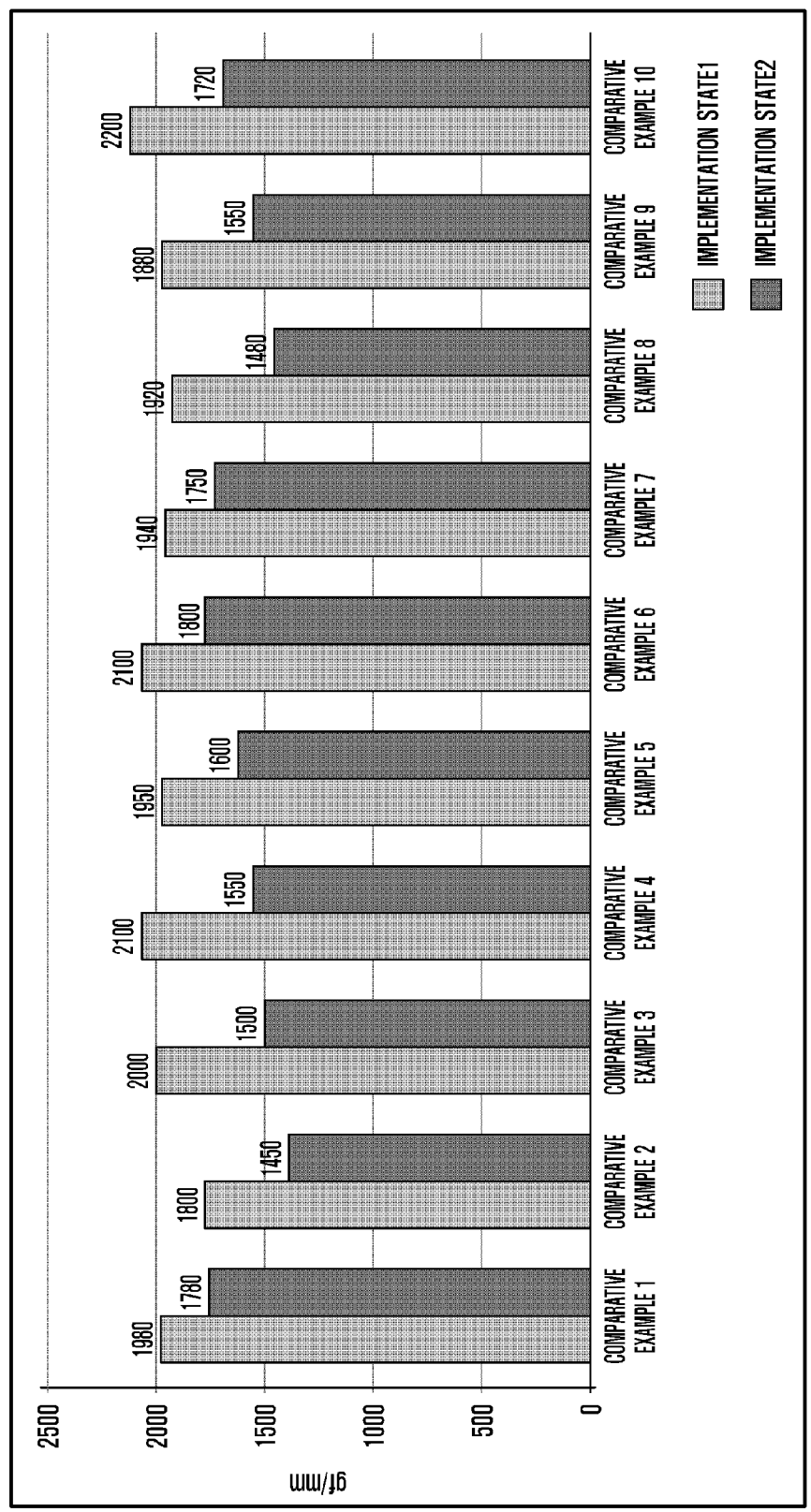
FIG. 9 is a graph showing the adhesive strengths of different adhesive examples, according to an embodiment of the present disclosure.

Referring to FIG. 9, the adhesive strengths of the compositions of Comparative examples 1 to 10 were slightly reduced at a high temperature as in Implementation state 2. Referring to FIGS. 6 to 8, the adhesive strengths of the compositions of Examples 1-1 to 1-10, 2-1 to 2-10, and 3-1 to 3-10 were lowered to levels at which the adhering substrate and adherend could be separated without damage by using less effort.

In addition, it can be verified that the adhesive strengths of the compositions of Examples 1-1 to 1-10 containing aluminum acetylacetonate were excellent at room temperature; and especially, the adhesive strengths of the compositions of Examples 1-4 to 1-7 were excellent at room temperature, and were lowered to levels, at which the adhering substrate and adherend could be separated without damage by using less effort in a high-temperature environment as in Implementation state 2.

FIGS. 1-11 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An adhesive sheet comprising a first adhesive layer including a thermo-reversible adhesive composition, wherein:
    the thermo-reversible adhesive composition contains a base resin, methyl acetoacetate, an alkyl ammonium-based surfactant, and a metal-organic complex compound having the formula $M(X)_n(R)_o$, wherein:
    M is a metal selected from the group consisting of aluminum and nickel,
    X is acetylacetonate,
    R is $H_2O$,
    n is an integer equal to 2 or 3, and
    o is an integer greater than or equal to 0 and less than or equal to 2, such that n+o is equal to 3 or 4;
    an adhesive strength of the first adhesive layer is 1400 gf/mm or higher at a temperature of 25° C. to 50° C.; and
    an adhesive strength of the first adhesive layer is between 150 and 1000 gf/mm or lower at a temperature of 65° C. to 80° C.

2. The adhesive sheet of claim 1, wherein the metal-organic complex compound is selected from the group consisting of aluminum acetylacetonate and nickel acetylacetonate.

3. The adhesive sheet of claim 1, wherein the content of the metal-organic complex compound in the composition is between 1 and 3 parts by weight per 100 parts by weight of the base resin.

4. The adhesive sheet of claim 1, wherein the content of the methyl acetoacetate in the composition is between 0.5 and 1 part by weight per 100 parts by weight of the base resin.

5. The adhesive sheet of claim 1, wherein the alkyl ammonium-based surfactant is at least one selected from the group consisting of cetyl trimethyl ammonium fluoride, cetyl trimethyl ammonium chloride, cetyl trimethyl ammonium bromide, and cetyl trimethyl ammonium iodide.

6. The adhesive sheet of claim 5, wherein the content of the alkyl ammonium-based surfactant in the composition is between 0.5 and 2 parts by weight per 100 parts by weight of the base resin.

7. The adhesive sheet of claim 1, wherein an adhesive strength of the first adhesive layer is between 1400 and 2800 gf/mm at a temperature of 25° C. to 50° C., and between 500 and 1000 gf/mm at a temperature of 65° C. to 80° C.

8. The adhesive sheet of claim 1, wherein an adhesive strength of the first adhesive layer is between 1400 and 2000 gf/mm at a temperature of 25° C. to 50° C., and between 300 and 1000 gf/mm at a temperature of 65° C. to 80° C.

9. The adhesive sheet of claim 1, wherein an adhesive strength of the first adhesive layer is between of 1400 and 1800 gf/mm at a temperature of 25° C. to 50° C., and between 150 and 1000 gf/mm at a temperature of 65° C. to 80° C.

10. The adhesive sheet of claim 1, wherein a thickness of the first adhesive layer is between 5 and 100 μm.

11. The adhesive sheet of claim 1, further comprising a second adhesive layer and a substrate, wherein:
    the first adhesive layer is disposed on a first surface of the substrate, and
    the second adhesive layer is disposed on a second surface of the substrate that is opposite to the first surface.

12. The adhesive sheet of claim 1, further comprising a substrate that is selected from the group consisting of polyethylene terephthalate (PET), poly(methylmethacrylate) (PMMA), polycarbonate (PC), polyurethane (PU), polyethylene (PE), a fabric, a copper (Cu) sheet, and an aluminum (Al) sheet.

13. An electronic device, comprising:
    a housing including a first plate, and a second plate facing the first plate;
    a first part disposed between the first plate and the second plate inside the housing, the first part including a first surface facing the first plate and a second surface facing the second plate;
    a second part disposed between the first surface and the second surface; and the adhesive sheet of claim 11.

14. The electronic device of claim 13, wherein:
    the first adhesive layer is in contact with at least a portion of the first surface or at least a portion of the second surface, and
    the second adhesive layer is in contact with at least a portion of the second part.

15. The electronic device of claim 13, wherein:
    the first adhesive layer is in contact with at least a portion of the second part, and
    the second adhesive layer is in contact with at least a portion of the first surface or at least a portion of the second surface.

16. The electronic device of claim 13, wherein the first part and the second part are a different portion of a-module of the electronic device.

\* \* \* \* \*